Sept. 8, 1964     J. F. KERN, JR     3,148,040
APPARATUS AND METHOD FOR DEHUMIDIFYING GASES
Filed April 25, 1960
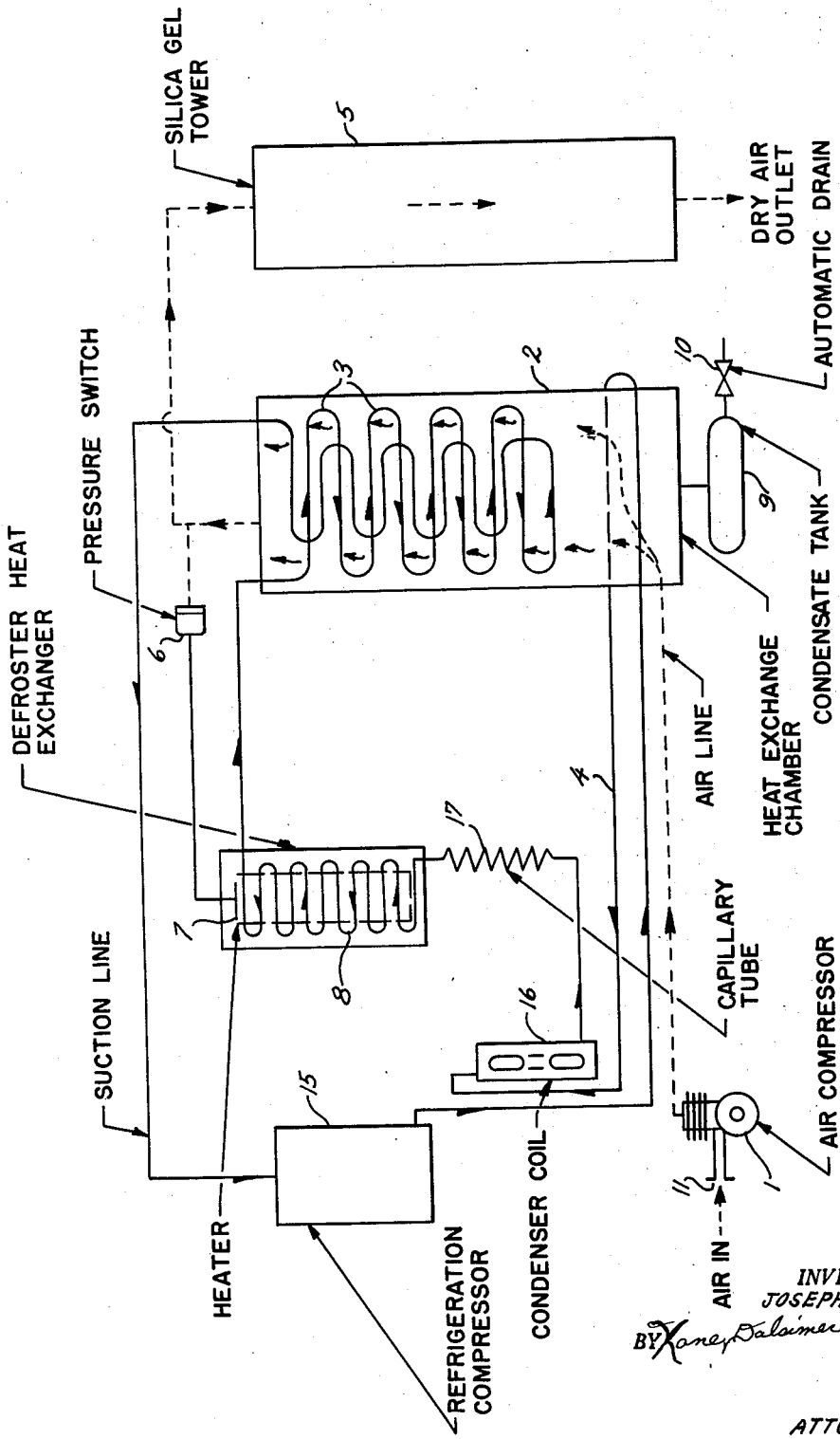
INVENTOR.
JOSEPH KERN, JR
BY Kane, Dalsimer & Kane
ATTORNEYS United States Patent Office 3,148,040
Patented Sept. 8, 1964

1

3,148,040
APPARATUS AND METHOD FOR
DEHUMIDIFYING GASES
Joseph F. Kern, Jr., Massapequa, N.Y., assignor to Puregas Equipment Corp., a corporation of New York
Filed Apr. 25, 1960, Ser. No. 24,306
8 Claims. (Cl. 55—31)

This invention relates to an improved method and apparatus for removing impurities from gases and particularly for remvoing moisture or water from gases such as air.

Heretofore, impurities such as water or moisture have been removed from gases such as air by cooling procedures, by adsorption and also by a combination of cooling and adsorption. However, the apparatus and methods heretofore used have presented certain difficulties and disadvantages. Thus, there has been considerable variation in the percentage of impurities present in the purified gases. Also, in certain procedures, it was necessary to shut down the operation while the apparatus was regenerated for further processing. In other methods and apparatus, duplicate treatment chambers were provided and it was necessary to alternately operate the chambers while the other chamber was being regenerated.

It is a prime object of the present invention to overcome the difficulties and disadvantages heretofore encountered and to provide an improved method and apparatus for removing impurities such as moisture or water from gases such as air, wherein the effective purification of the gases is maintained at a substantially uniform level throughout the cycle of operation; which may be operated continuously without the necessity of shutting down the appaartus for regenerating; and which eliminates the necessity for providing duplicate, alternately operating purification chambers.

Further objects include the provision of a simple method and apparatus of the above character requiring relatively few parts and which is easy to operate.

My invention is applicable to the purification of gases by removing therefrom an impurity such as moisture or water which can be condensed and also frozen or solidified by cooling. In carrying out my invention, I contemplate first, passing the gases to be purified, preferably after they have been pressurized through a cooling area having a heat exchange surface maintained at a temperature below the freezing temperature of the impurities so as to cool the gases to a point below the freezing point of the impurities to thereby extract impurities from the gases. Thereafter, the cooled gases are continuously flowed from the cooling chamber over an adsorbent material capable of adsorbing the impurity. When, the heat exchange surface has become sufficiently frosted to interfere with the cooling of the gases, the cooling surface is defrosted by heating it to a temperature above the melting point of the impurity and gases to be purified are continued to be passed through the cooling chamber and flowed over the adsorbent material. During this portion of the cycle of operation, impurities in the gases are adsorbed by the adsorbent material. Finally, after the heat exchange surface has been defrosted, the cooling surface is once again cooled to a temperature below the freezing point of the impurity and the first portion of the cycle of operation is reinitiated with the gases cooled in the cooling chamber to a temperature below the freezing point of the impurities, to thereby remove impurities from the gases. The cooled gases flowing from the cooling chamber over the adsorbent material are naturally warmed above the saturation point and they serve to regenerate the adsorbent material by slowly re-adsorbing the impurities into the air. Thus, the purification process and apparatus are maintained in continuous operation and serve to purify the gases to an approximately uniform level throughout the cycle of operation.

Other advantages of my invention will be best understood if viewed in light of the following explanation and in view of the accompanying drawing wherein the drawing is a schematic illustration of apparatus which may be utilized to practice my method.

Referring now to the drawing, moist gas such as air is pumped into a refrigerated heat exchange chamber 2 at any desired pressure by means of an air compressor 1 having an air inlet 11. The heat exchange chamber 2 is cooled by an artificial refrigeration system of any well known type and comprises the refrigeration compressor 15, the condenser coil 16, the capillary tube 17, the coils 3, and associated piping interconnecting these functioning parts of the refrigeration system. The heat exchange chamber 2 is designed such that the intake gas entering the inlet 11 will leave the heat exchange chamber 2 with a moisture content lower than the requisite predetermined maximum. This is accomplished by cooling the gas circulating through the heat exchange chamber 2 to a point much below the freezing point or sublimation temperature of the water vapor and therefore frost will collect and eventually clog the heat exchange chamber 2. The gases are then flowed over an adsorbent material capable of adsorbing the impurity. For this purpose any adsorbent material capable of adsorbing the impurity without contaminating or adversely affecting the other gases may be used, such as silica gel, aluminum oxide, particularly activated aluminum oxide, charcoal, particularly activated charcoal, fuller's earth, diatomaceous earth, kaolin, bentonite or a molecular sieve depending upon the particular impurity to be removed. In removing moisture or water from gases such as air, I have found that silica gel and activated alumina are particularly effective and in the drawing, I have specifically labeled the adsorbent material 5 as silica gel. If the cooled gases passing through the adsorbent material 5 have a greater affinity for water vapor than the adsorbent material 5 then the water vapor will be transferred from the adsorbent material 5 to the gas until equilibrium has been reached and then the adsorbent material will no longer give up moisture to the gas passing therethrough. The gas passes out of the heat exchange chamber 2 and into the piping or gas duct interconnecting the cooling chamber 2 and the adsorbent material 5. This last mentioned gas duct is surrounded by the local atmosphere which is warmer than in the heat exchange chamber 2 and the gas passing through this gas duct is consequently warmed before it passes over the adsorbent material 5 to a point above the saturation point so that it is capable of adsorbing water vapor. The adsorbent material and the physical plan of the unit in which it is placed should be designed such that the maximum rate of release of moisture to the cooled gas will be slow enough to prevent the existing gas moisture content in the cooled or circulating gas from rising above the predetermined design level.

Eventually of course the frost which is accumulating in the heat exchange chamber 2 will reach a maximum predetermined level, and a sensing unit such as the pressure switch 6 illustrated in the drawing may be utilized to sense this predetermined level. It is not necessary that a pressure switch be used, however a pressure switch is a convenient way. Also a timer system if properly designed would be adequate. Any other sensing unit which will determine the amount of frost in the heat exchange chamber 2 will do just as well. The frost which builds up in the heat exchange chamber 2 impedes the flow of the circulating air through the heat exchange chamber 2 and therefore causes a greater resistance to the flow and consequently a greater pressure drop in the heat exchange chamber 2. When the pressure drop is such that the pressure reaches a predetermined level the pressure switch 6 actuates and this information is relayed to an electrical heating unit 7 inserted in the artificial refrigeration system and which has the refrigerant coils 8 of the artificial refrigeration system wound thereabout and heating unit 7 is turned on. A designer has the option of either heating the refrigerant entering the heat exchange chamber 2 or heating the heat exchange chamber 2 itself to thereby melt all or a portion of the frost which has collected on the inside of the heat exchange. The subsequent decrease in pressure drop across the heat exchange chamber 2 will cause the pressure at switch 6 to rise and the pressure switch 6 will cause the defrost heaters 7 to be turned off. The melted frost is discharged from the unit through some suitable drain such as the condensate tank 9 emptied through a drain 10.

During the defrosting operation the gas entering the heat exchange chamber 2 will pass through the heat exchange chamber 2 and will possibly pick-up moisture but at least lose less moisture than the air which is circulating through the heat exchange chamber 2 when the heaters 7 are off. This gas now has more water content than can be tolerated by the system and now passes through the adsorbent material 5 which has been previously regenerated by what may be termed the superdried gas prior to the defrost cycle and which is designed to be capable of removing enough moisture from the moist gas to bring the moisture content below the predetermined design level.

After the defrost cycle the regeneration cycle starts again, and during the regeneration cycle the refrigerated heat exchange chamber 2 cools the gases so that the gases can pick-up the moisture that was adsorbed by the adsorbent material 5 during the defrost cycle.

The aforedescribed drying of gas has been successfully applied in producing low pressure air with a design dewpoint of minus 20° F. Specifically moist gas or atmospheric air is compressed to approximately 30 p.s.i.g. in the air compressor 1 and is piped to the heat exchange chamber 2. The heat exchange chamber 2 is refrigerated by means of Freon gas at minus 40° F. circulating through the coils 3 inside the heat exchange chamber 2. The incoming air enters the bottom of the heat exchange chamber 2 which is kept at a temperature above 32° F. by means of heat exchange between the refrigeration hot gas discharge line 4 and the shell surface of the heat exchange 2. This procedure is followed at the bottom of the heat exchange chamber 2 so that the moisture in the intake lines does not prematurely freeze out of the air and clog the air lines leading to the air inlet at the bottom of the heat exchange chamber 2.

The air passes over the refrigeration coils 3 in the heat exchange chamber 2 and is cooled to about minus 25° F. This cooling causes the moisture in the air to condense out in the form of frost on the coils 3, and the moisture content of the air leaving the heat exchange chamber 2 is about .5 grain per lb. of air. The super-dried air now passes through the adsorbent material 5, for example, silica gel. If the vapor pressure of moisture adsorbed in the silica gel is above the vapor pressure of the moisture in the air entering the silica gel, the air will slowly pick-up moisture from the silica gel. As the process continues the silica gel is slowly regenerated or reactivated.

Frost in the heat exchange chamber 2 will build up and increase the pressure drop across the heat exchange chamber 2. When a predetermined pressure drop occurs the pressure switch 6 turns on the heaters 7 which in turn heats up the refrigerant circulating through the coils 8 in the heat exchange chamber coils 3. The warmed refrigerant which is the Freon circulating through the heat exchange coils 3 melts off enough frost in the heat exchange 2 to bring the pressure drop down to a predetermined level and this reduced pressure drop causes the pressure switch 6 to open the circuit to the heater 7. The thermal lag of the heater 7 and the heat exchange chamber 2 keeps the system defrosting for a few minutes after the heaters are turned off and during the defrost cycle the liquid condensate drains to the bottom of the heat exchange chamber 2 and flows through an opening to the condensate tank 9 which has attached thereto a drain 10 for periodically and automatically draining the tank. During the defrost cycle the air passing through the heat exchange chamber 2 cannot be cooled any lower than the temperature of the melting frost, therefore the air leaves the heat exchange 2 relatively wet (about plus 20° F. dewpoint). The relatively wet air is now dried by the adsorbent material 5.

In the unit which I have utilized to practice my invention, I have found that under conditions of high humidity the heat exchange chamber 2 produces super-dried air for about two hours before a significant pressure drop develops across the heat exchange chamber 2. When this pressure drop is about 10 p.s.i. the pressure switch 6 turns on the heating unit 7 and when the pressure drop decreases to about 7 p.s.i. in response thereto the pressure switch 6 opens the circuit to the heating unit 7. It takes about five minutes for the defrost cycle to be completed and the heat exchanger to be recooled to its normal operating temperature of −40° F.

For five minutes the air entering the adsorbent material, for example, the silica gel tower 5 has a moisture content of 15 grains per pound and for two hours the air entering the silica gel tower 5 has a moisture content of .55 grain per pound of air.

It should be apparent that a significantly small amount of adsorbent material can be utilized in my invention and this adds to the attractiveness thereof. This is true because the adsorbent material is regenerated during the larger portion of the cycle by the circulating air itself.

The utility of my invention should be apparent, but to be more specific, and as an example, pressurized dry air can be and is utilized in electrical communication cables and in air tempering systems for dwellings or other buildings and the like.

What I have described is what I believe to be the best mode of practicing my invention and I believe that I am entitled to the full scope of the inventive concept expressed therethrough.

What I claim is:

1. The method of purifying gas by removing therefrom an impurity which can be condensed and also frozen or solidified by cooling which comprises; first, passing gases to be purified through a cooling area having a heat exchange surface maintained at a temperature below the freezing temperature of the impurities so as to cool the gases to a predetermined temperature below the freezing point of the impurities to thereby extract impurities from the gas and continuously flowing the said cooled gases from the said cooling area over an adsorbent material which is capable of adsorbing the impurity, a certain portion of the impurities being condensed and frozen on the heat exchange surface of the cooling area during this first portion of the cycle of operation; then, when sufficient impurities have deposited on said heat exchange surface defrosting the said cooling surface by heating it above the melting point of said impurity, and removing the defrosted impurity condensate from the cooling area while continuing to pass gases to be purified through the said cooling area and flowing them over said adsorbent material, the said gases flowing from said cooling area during this second portion of the cycle of operation being at a temperature above said aforementioned predetermined temperature and having a surplus of impurities whereby the adsorbent material adsorbs impurities from said gases; and finally, when the heat exchange surface has been defrosted, cooling said heat exchange surface to said first mentioned temperature below the freezing point of the impurity and continuing to pass gases to be purified through said cooling area and flowing them outwardly through said cooling area over the adsorbent material in accordance with the first portion of the cycle of operation to remove impurities in said cooling area and to regenerate said absorbent material by slowly readsorbing the impurities into the purified gases.

2. The method of purifying gases by removing therefrom an impurity which can be condensed and also frozen or solidified by cooling as set-forth in claim 1 in which the gases to be purified are first pressurized to a pressure above the atmospheric pressure before being introduced into the cooling area and are maintained at super-atmospheric pressure while flowed over the adsorbent material.

3. The method of removing water or moisture from gases such as air which comprises; first, passing gases to be purified through a cooling area having a heat exchange surface maintained at a temperature below the freezing temperature of water so as to cool the gases to a point below the freezing point of water to thereby extract water from the gas and continuously flowing the said cooled gases from the said cooling area over an adsorbent material which absorbs water, a certain portion of the water being condensed and frozen on the heat exchange surface of said cooling area during this first portion of the cycle of operation; then, when sufficient ice has deposited on said heat exchange surface, defrosting the said cooling surface by heating it above the melting point of ice, and removing the defrosted impurity condensate from the cooling area while continuing to pass gases to be purified through the said cooling area and flowing them over said adsorbent material, the said gases flowing from said cooling area during this second portion of the cycle of operation being at a temperature above said aforementioned point and having a surplus of water whereby the adsorbent material adsorbs water from said gases; and finally, when the heat exchange surface has been defrosted, cooling said heat exchange surface to said point below the freezing point of the water and continuing to pass gases to be purified through said cooling area, flowing them outwardly through said cooling chamber over the adsorbent material in accordance with the first portion of the cycle of operation to remove water in said cooling area and to regenerate said absorbent material by slowly readsorbing the water in the purified gases.

4. The method of removing water or moisture from gases such as air as set-forth in claim 3 in which the gases to be purified are first pressurized to a pressure above the atmospheric pressure before being introduced into the cooling area and are maintained at superatmospheric pressure while flowed over the adsorbent material.

5. The method of removing water or moisture from gases such as air as set-forth in claim 3 in which the temperature of the gases is raised while flowed outwardly from the cooling chamber and exposed to the ambient temperature conditions.

6. Apparatus for removing water or moisture from gases in a continuous, uninterrupted cyclical operation comprising means providing a heat exchange chamber with an inlet and outlet for the gases being treated and having a heat exchange surface, refrigerating means for cooling said heat exchange surface of the gases being treated below the freezing temperature of water to thereby extract water from the gases, defrosting means for heating and defrosting the heat exchange surface when it becomes sufficiently coated with ice, means for permitting the removal of the defrosted ice coating from the heat exchange chamber providing means, means providing an adsorption chamber with an inlet and outlet for the gases being treated and having adsorbent material for adsorbing water from the gases being treated, means providing a conduit for conducting the gases from the outlet of the heat exchange chamber to the inlet of the adsorption chamber whereby the cooled gases from the heat exchange chamber are warmed by exposure to ambient temperature conditions, above its saturation point by the time it reaches the adsorption material and means for causing the gases being treated to flow into the heat exchange chamber through the conduit into the adsorption chamber past the adsorbent material and out of the adsorption chamber in a continuous cycle in which the water is first removed from the gases in the heat exchange chamber, then during defrosting the water is adsorbed from the gases by the adsorbent material and finally after defrosting the water is again removed from the gases in the heat exchange chamber and the adsorbent material is regenerated by the gases.

7. The method of purifying gas by removing therefrom an impurity which can be condensed and also frozen or solidified by cooling which comprises: first, passing gases to be purified through a cooling area having a heat-exchange surface maintained at a temperature below the freezing temperature of the impurities so as to cool the gases to a predetermined temperature below the freezing point of the impurities to thereby extract impurities from the gas and continuously flowing the said cooled gases from the said cooling area over an adsorbent material which is capable of adsorbing the impurity, a certain portion of the impurities being condensed and frozen on the heat-exchange surface of the cooling area during this first portion of the cycle of operation; then when sufficient impurities have deposited on said heat-exchange surface, defrosting the said cooling surface by heating it above the melting point of said impurity and removing the defrosted impurity condensate from the cooling area while continuing to pass gases to be purified over said adsorbent material, the said gases flowing over said adsorbent material during this second portion of the cycle of operation being at a temperature above said aforementioned predetermined temperature and having a surplus of impurities whereby the adsorbent material adsorbs impurities from said gases; and, finally, when the heat-exchange surface has been defrosted, cooling said heat-exchange surface to said first-mentioned temperature below the freezing point of the impurity and continuing to pass gases to be purified through said cooling area and flowing them outwardly through said cooling area over the adsorbent material in accordance with the first portion of the cycle of operation to remove impurities in said cooling area and to regenerate said adsorbent material by slowly readsorbing the impurities into the purified gases.

8. The method of removing water or moisture from gases such as air which comprises: first, passing gases to be purified through a cooling area having a heat-exchange surface maintained at a temperature below the freezing temperature of water so as to cool the gases to a point below the freezing point of water to thereby extract water from the gas and continuously flowing the said cooled gases from the said cooling area over an adsorbent material which adsorbs water, a certain portion of the water being condensed and frozen on the heat-exchange surface of said cooling area during this first portion of the cycle of operation; then, when sufficient ice has deposited on said heat-exchange surface, defrosting the said cooling surface by heating it above the melting point of ice and removing the defrosted impurity condensate from the cooling area while continuing to pass gases to be purified over said adsorbent material, the said gases passing over said adsorbent material during this second portion of the cycle of operation being at a temperature above said aforementioned point and having a surplus of water whereby the adsorbent material adsorbs water from said gases; and, finally, when the heat-exchange surface has been defrosted, cooling said heat-exchange surface to said point below the freezing point of the water and continuing to pass gases to be purified through said cooling area, flowing them outwardly through said cooling chamber over the adsorbent material in accordance with the first portion of the cycle of operation to remove water in said cooling area and to regenerate said adsorbent material by slowly readsorbing the water in the purified gases.

References Cited in the file of this patent

UNITED STATES PATENTS

| | | |
|---|---|---|
| 1,872,783 | Miller | Aug. 23, 1932 |
| 1,984,054 | Carraway | Dec. 11, 1934 |
| 2,622,414 | Jaubert | Dec. 23, 1952 |
| 2,728,197 | Ellenberger | Dec. 27, 1955 |